US012332390B2

(12) United States Patent
Dong et al.

(10) Patent No.: US 12,332,390 B2
(45) Date of Patent: Jun. 17, 2025

(54) ONLINE DETECTION SYSTEM FOR TYPE IDENTIFICATION AND ACTIVITY MEASUREMENT OF RADIATIONS IN GAS OR LIQUID

(71) Applicant: Chengdu University of Technology, Chengdu (CN)

(72) Inventors: Chunhui Dong, Chengdu (CN); Ming Wang, Chengdu (CN); Qingxian Zhang, Chengdu (CN); Gang Li, Chengdu (CN); Qichang Huang, Chengdu (CN); Lingfeng Wei, Chengdu (CN); Weinan Li, Chengdu (CN); Jingxin Zuo, Chengdu (CN); Weixin Peng, Chengdu (CN); Kaiyong Liao, Chengdu (CN); Yi Gu, Chengdu (CN); Feng Cheng, Chengdu (CN); Fei Li, Chengdu (CN); Muhao Zhang, Chengdu (CN)

(73) Assignee: Chengdu University of Technology

( * ) Notice: Subject to any disclaimer, the term of this patent is extended or adjusted under 35 U.S.C. 154(b) by 200 days.

(21) Appl. No.: 18/126,489

(22) Filed: Mar. 27, 2023

(65) Prior Publication Data

US 2023/0350084 A1    Nov. 2, 2023

(30) Foreign Application Priority Data

Apr. 28, 2022 (CN) .......................... 202210457386.3
May 20, 2022 (CN) .......................... 202210548691.3

(51) Int. Cl.
*G01T 1/20* (2006.01)

(52) U.S. Cl.
CPC .................................. *G01T 1/2018* (2013.01)

(58) Field of Classification Search
None
See application file for complete search history.

(56) References Cited

U.S. PATENT DOCUMENTS

| | | | | |
|---|---|---|---|---|
| 2004/0238751 | A1* | 12/2004 | Penn | G01T 3/00 250/390.01 |
| 2009/0261261 | A1* | 10/2009 | Rodgers | G01T 1/178 250/370.11 |
| 2010/0226580 | A1* | 9/2010 | Frank | G06F 18/00 382/209 |

* cited by examiner

Primary Examiner — Edwin C Gunberg

(57) ABSTRACT

The online detection system for type identification and activity measurement of radiations in gas or liquid is provided, which can capture the light signals generated by different radiations in real time, and convert the light signals into the electrical signals, so as to realize the online type identification and activity measurement of the radiations based on the waveforms and the time information of the electrical signals of the different radiations. In addition, based on the characteristic that different radiations have different penetration capabilities, the inner-outer two-layer activity measurement structure is designed, which can discriminate the radiations with the same waveform. Therefore, the present disclosure simplifies the radiation activity measurement process, thereby greatly improving the efficiency of the radiation activity measurement.

9 Claims, 4 Drawing Sheets

ONLINE DETECTION SYSTEM FOR TYPE IDENTIFICATION AND ACTIVITY MEASUREMENT OF RADIATIONS IN GAS OR LIQUID

TECHNICAL FIELD

The present disclosure relates to the technical field of radiation detection, and in particular to an online detection system for type identification and activity measurement of radiations in gas or liquid.

BACKGROUND

At present, the activity measurement of each radiation is generally the measurement of radioactivity in liquid through liquid scintillation counting. That is, influences of other interfering radiations are eliminated from the liquid in a chemical manner; then, a single to-be-measured radiation solution is prepared; and finally, the activity measurement of the radiation is performed through the liquid scintillation counting. In the case that the radiation activity is low, it is necessary to concentrate the single to-be-measured radiation solution. In addition, the liquid scintillation counting takes a long time, typically three days, to complete the measurement process, which failed to realize real-time online radiation measurement. Therefore, there are problems in the related art that the radiation activity measurement process is complex and takes a long time, thereby resulting low efficiency. Based on the above, it is urgent to provide an online detection system for type identification and activity measurement of radiations.

SUMMARY

The present disclosure aims to provide an online detection system for type identification and activity measurement of radiations in gas or liquid, to solve the problems in the related art that the radiation activity measurement has a complex process and takes a long time and thereby resulting in low efficiency.

In order to realize the above objectives, the technical solutions adopted in the present disclosure are described below.

According to a first aspect, the present disclosure provides an online detection system for type identification and activity measurement of radiations in gas or liquid, including: a detector and an electronic processing unit. The detector includes a radiation inlet, a first measurement chamber, a second measurement chamber, and a radiation outlet. The radiation inlet is communicated with an end of the first measurement chamber, and the radiation outlet is communicated with the other end of the first measurement chamber.

The first measurement chamber is located in the second measurement chamber. A first radiation detection assembly is disposed in the first measurement chamber, and a second radiation detection assembly is disposed in the second measurement chamber. The first measurement chamber and the second measurement chamber are separated by a first housing.

The first radiation detection assembly is configured to detect a first scintillation light signal of each to-be-identified radiation in to-be-measured material introduced into the first measurement chamber from the radiation inlet, and convert the first scintillation light signal of each to-be-identified radiation into an electrical signal, so as to be transmitted to the electronic processing unit. The first scintillation light signal of any to-be-identified radiation is generated when the to-be-identified radiation irradiates the first radiation detection assembly, and the first housing is configured to separate the to-be-identified radiations with different penetration capabilities in the first measurement chamber.

The second radiation detection assembly is configured to detect a second scintillation light signal of a target radiation in the second measurement chamber, and convert the second scintillation light signal of the target radiation into an electrical signal, so as to be transmitted to the electronic processing unit. The second scintillation light signal of the target radiation is generated when the target radiation irradiates the second radiation detection assembly, and the target radiation is the to-be-identified radiation in the first measurement chamber that is able to penetrate the first housing.

The electronic processing unit is configured to generate a waveform of each to-be-identified radiation based on the electrical signal of each to-be-identified radiation and the electrical signal of the target radiation, and obtain a type and an activity measurement result of each to-be-identified radiation based on the waveform of each to-be-identified radiation.

Based on the above design, the online detection system provided by the present disclosure can capture the light signals generated by different radiations in real time, and convert the light signals into the electrical signals, so as to realize the online type identification and activity measurement of the radiations based on the waveforms and the time information of the electrical signals of the different radiations. In addition, based on the characteristic that different radiations have different penetration capabilities, the inner-outer two-layer activity measurement structure is designed, which can discriminate the radiations with the same waveform. Therefore, the present disclosure simplifies the radiation activity measurement process, thereby greatly improving the efficiency of the radiation activity measurement, and can realize online activity measurement of various radiations, which is suitable for large-scale application and promotion in the field of radiation measurement.

In an embodiment, a first structure of the online detection system is configured to measure the activities of the alpha (α) radiation, the β radiation, and the γ radiation in the to-be-measured material.

In the case that the to-be-measured material includes the α radiation, the β radiation, and the γ radiation, the first radiation detection assembly includes a first photomultiplier tube, a second photomultiplier tube, and a plurality of first plastic scintillating fibers. The second radiation detection assembly includes a third photomultiplier tube, a fourth photomultiplier tube, and a plurality of second plastic scintillating fibers.

The plurality of first plastic scintillating fibers extend from an end of the first measurement chamber to the other end. A surface of each first plastic scintillating fiber is coated with silver-doped zinc sulfide. An end of each first plastic scintillating fiber is connected to the first photomultiplier tube, and the other end of each first plastic scintillating fiber is connected to the second photomultiplier tube. The first photomultiplier tube and the second photomultiplier tube are both electrically connected to the electronic processing unit. In response to that the first photomultiplier tube and the second photomultiplier tube receive the first scintillation light signals, the first photomultiplier tube and the second photomultiplier convert the first scintillation light signals into the electrical signals and transmit the electrical signals to the electronic processing unit, respectively. And in response to that the electronic processing unit simultaneously receives the electrical signals transmitted from the first photomultiplier tube and the second photomultiplier tube, an effective signal acquisition of each to-be-identified radiation in the first measurement chamber is completed.

The plurality of second plastic scintillating fibers extend from an end of the second measurement chamber to the other end. An end of each second plastic scintillating fiber is connected to the third photomultiplier tube, and the other end of each second plastic scintillating fiber is connected to the fourth photomultiplier tube. The third photomultiplier tube and the fourth photomultiplier tube are both electrically connected to the electronic processing unit. In response to that the third photomultiplier tube and the fourth photomultiplier tube receive the second scintillation light signal, the third photomultiplier tube and the fourth photomultiplier tube convert the second scintillation light signal into the electrical signals and transmit the electrical signals to the electronic processing unit. And in response to that the electronic processing unit simultaneously receives the electrical signals transmitted from the third photomultiplier tube and the fourth photomultiplier tube, an effective signal acquisition of the target radiation in the second measurement chamber is completed.

In an embodiment, the electronic processing unit includes: an analog-to-digital converter (ADC) chip, a field-programmable gate array (FPGA) chip, and four amplifier chips.

Each of the first photomultiplier tube, the second photomultiplier tube, the third photomultiplier tube and the fourth photomultiplier tube is electrically connected to an input terminal of the ADC chip through one of the four amplifier chips. Output terminals of the ADC chip is electrically connected to the FPGA chip. The FPGA chip is configured to complete the type identification and the activity measurement of the $\alpha$ radiation, the $\beta$ radiation, and the $\gamma$ radiation in the to-be-measured material, based on the electrical signals outputted from the first photomultiplier tube, the second photomultiplier tube, the third photomultiplier tube and the fourth photomultiplier tube.

Further, the FPGA chip is configured to obtain a coincidence measurement result of the $\alpha$ radiation and a total coincidence measurement result of the $\beta$ radiation and the $\gamma$ radiation, based on the waveforms obtained by the electrical signals outputted from the first photomultiplier tube and the second photomultiplier tube; and obtain a coincidence measurement result of the $\gamma$ radiation, based on the waveform obtained by the electrical signals outputted from the third photomultiplier tube and the fourth photomultiplier tube.

The FPGA chip is further configured to perform anti-coincidence measurement based on the total coincidence measurement result of the $\beta$ radiation and the $\gamma$ radiation and the coincidence measurement result of the $\gamma$ radiation, to obtain an activity measurement result of the $\beta$ radiation.

In an embodiment, a second structure of the online detection system is configured to measure the activities of the heavy particle radiation, the $\alpha$ radiation, the $\beta$ radiation, the $\gamma$ radiation, and the neutron (n) radiation in the to-be-measured material. The difference with the first structure only lies in that: the plastic scintillating fibers used in the first radiation detection assembly and the second radiation detection assembly are different in type. The second structure is as follows:

In a case that the to-be-measured material includes the heavy particle radiation, the $\alpha$ radiation, the $\beta$ radiation, the $\gamma$ radiation, and the n radiation. The first radiation detection assembly includes a first photomultiplier tube, a second photomultiplier tube and a plurality of first pulse shape discrimination (PSD) plastic scintillating fibers. The second radiation detection assembly includes a third photomultiplier tube, a fourth photomultiplier tube, and a plurality of second PSD plastic scintillating fibers.

The plurality of first PSD plastic scintillating fibers extend from an end of the first measurement chamber to the other end. An end of each first PSD plastic scintillating fiber is connected to the first photomultiplier tube, and the other end of each first PSD plastic scintillating fiber is connected to the second photomultiplier tube. The first photomultiplier tube and the second photomultiplier tube are both electrically connected to the electronic processing unit. In response to receiving the first scintillation light signals, the first photomultiplier tube and the second photomultiplier tube convert the first scintillation light signals into the electrical signals, and transmit the electrical signals to the electronic processing unit respectively. And in response to that the electronic processing unit simultaneously receives the electrical signals transmitted from the first photomultiplier tube and the second photomultiplier tube, an effective signal acquisition of each to-be-identified radiation in the first measurement chamber is completed.

The plurality of second PSD plastic scintillating fibers all extend from an end to the other end of the second measurement chamber. An end of each second PSD plastic scintillating fiber is connected to the third photomultiplier tube, and the other end of each second PSD plastic scintillating fiber is connected to the fourth photomultiplier tube. The third photomultiplier tube and the fourth photomultiplier tube are both electrically connected to the electronic processing unit. In response to receiving the second scintillation light signal, the third photomultiplier tube and the fourth photomultiplier tube convert the second scintillation light signal into the electrical signals, and transmit the electrical signals to the electronic processing unit. And in response to that the electronic processing unit simultaneously receives the electrical signals transmitted from the third photomultiplier tube and the fourth photomultiplier tube, an effective signal acquisition of the target radiation in the second measurement chamber is completed.

In an embodiment, the electronic processing unit includes: an ADC chip, a FPGA chip, and four amplifier chips.

Each of the first photomultiplier tube, the second photomultiplier tube, the third photomultiplier tube and the fourth photomultiplier tube is electrically connected to an input terminal of the ADC chip through one of the four amplifier chips. Output terminals of the ADC chip are electrically connected to the FPGA chip. The FPGA chip is configured to complete the type identification and the activity measurement of the heavy particle radiation, the $\alpha$ radiation, the $\beta$ radiation, the $\gamma$ radiation, and the n radiation in the to-be-measured material, based on the electrical signals outputted from the first photomultiplier tube, the second photomultiplier tube, the third photomultiplier tube and the fourth photomultiplier tube.

Further, the FPGA chip is configured to obtain the waveforms of the heavy particle radiation, the $\alpha$ radiation, and the n radiation, based on the electrical signals outputted from the first photomultiplier tube and the second photomultiplier tube; and perform the type identification and the activity measurement of the heavy particle radiation, the $\alpha$ radiation, and the n radiation, according to the waveforms of the heavy particle radiation, the $\alpha$ radiation, and the n radiation. The electrical signals outputted from the first photomultiplier tube and the second photomultiplier tube are generated based on the first scintillation light signal generated when each to-be-identified radiation irradiates each first PSD plastic scintillating fiber.

Further, the FPGA chip is configured to perform the type identification and the activity measurement of the γ radiation in the to-be-measured material, based on the waveform obtained by the electrical signals outputted from the third photomultiplier tube and the fourth photomultiplier tube. The electrical signals outputted from the third photomultiplier tube and the fourth photomultiplier tube are generated based on the second scintillation light signal generated when the target radiation irradiates each second PSD plastic scintillating fiber.

Further, the FPGA chip is configured to obtain a total activity of the β radiation and the γ radiation, based on the waveforms obtained by the electrical signals outputted from the first photomultiplier tube and the second photomultiplier tube; and obtain an activity measurement result of the β radiation, based on the total activity of the β radiation and the γ radiation and an activity measurement result of the γ radiation.

Beneficial Effects:
(1) The online detection system provided by the present disclosure can identify the types of different radiations and measure the activities of different radiations in real time. Specifically, the online detection system can capture the light signals generated by different radiations in real time, and convert the light signals into the electrical signals, so as to realize the online type identification and activity measurement of the radiations based on the waveforms and the time information of the electrical signals of different radiations. In addition, based on the characteristic that different radiations have different penetration capabilities, the inner-outer two-layer activity measurement structure is designed, which can discriminate the radiations with the same waveform. Therefore, the present disclosure simplifies the radiation activity measurement process, thereby greatly improving the efficiency of the radiation activity measurement, and can realize online activity measurement of various radiations, which is suitable for large-scale application and promotion in the field of radiation measurement.
(2) The detection system provided by the present disclosure has a simple structure, in which the PSD plastic scintillating fibers or the ordinary plastic scintillating fibers are used. The plastic scintillating fibers have properties of stability, moisture resistance, corrosion resistance, and have no need for strict measurement environment (For example, the high purity germanium needs liquid nitrogen cooling).
(3) Due to the use of the array structure in which the optical fibers are parallelly arranged, the contact area between the to-be-measured material and the plastic scintillating fibers is large, and accordingly the number of the rays incident into the plastic scintillating fibers per unit time is large. In this way, the radioactive liquid with a low activity can ensure that there are enough rays incident into the detector per unit time, thereby lowering the detection limit of the system.
(4) When the plastic scintillators are used for radiation activity measurement, since the pulse widths of the output signals of the plastic scintillators are narrow, such as only a few to a dozen nanoseconds, the probability of overlapping between pulses per unit time is small, thereby improving the activity upper limit of the detected radiations of the detection system.

REFERENCE NUMERALS

101, radiation inlet; 102, first measurement chamber; 103, second measurement chamber; 104, first radiation detection assembly; 105, second radiation detection assembly; 106, first housing; 107, second housing; 108, third housing; 109, radiation outlet.

DETAILED DESCRIPTION OF THE EMBODIMENTS

Figure 1:
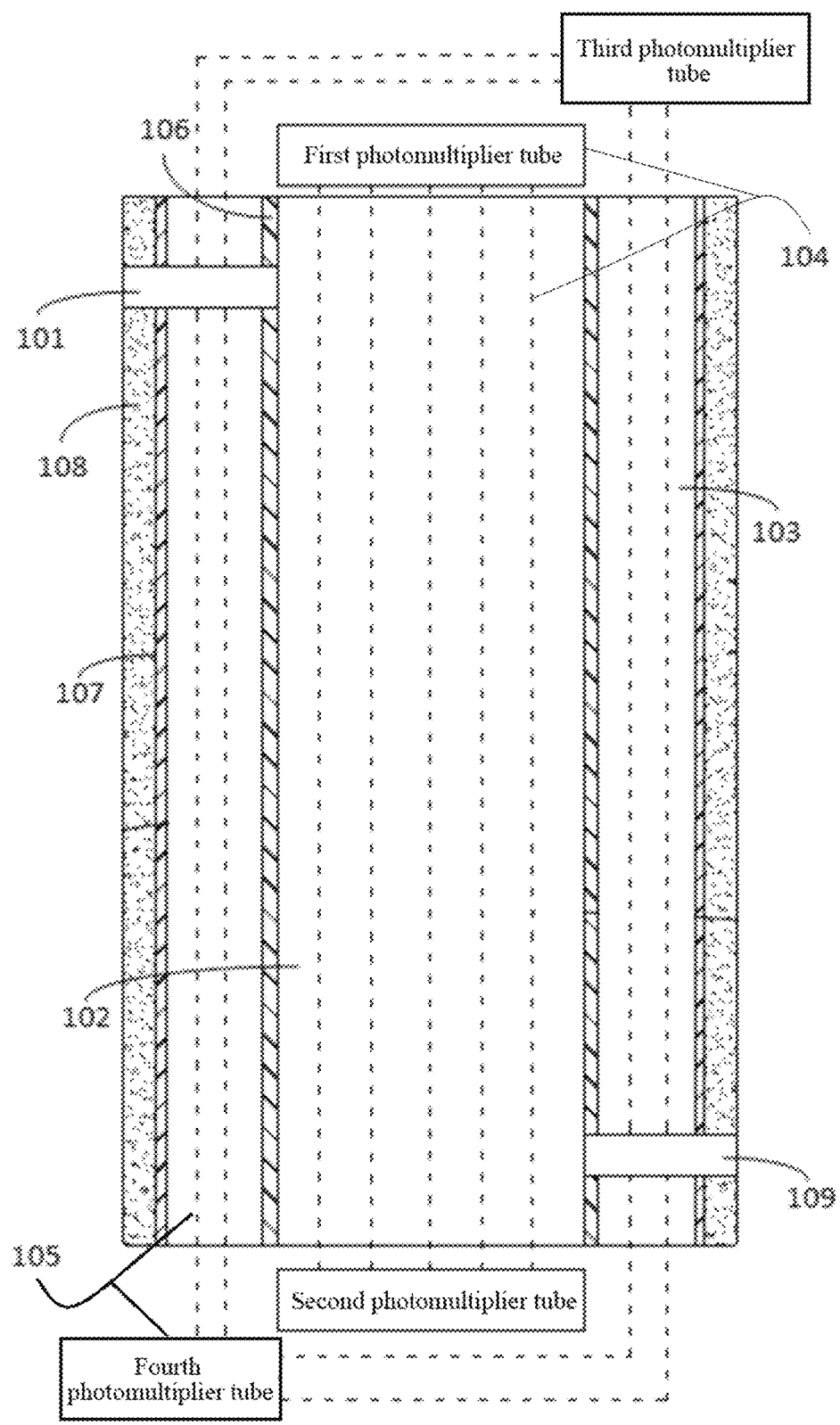
FIG. 1 is a schematic structure diagram of a detector according to an embodiment of the present disclosure.
Figure 2:
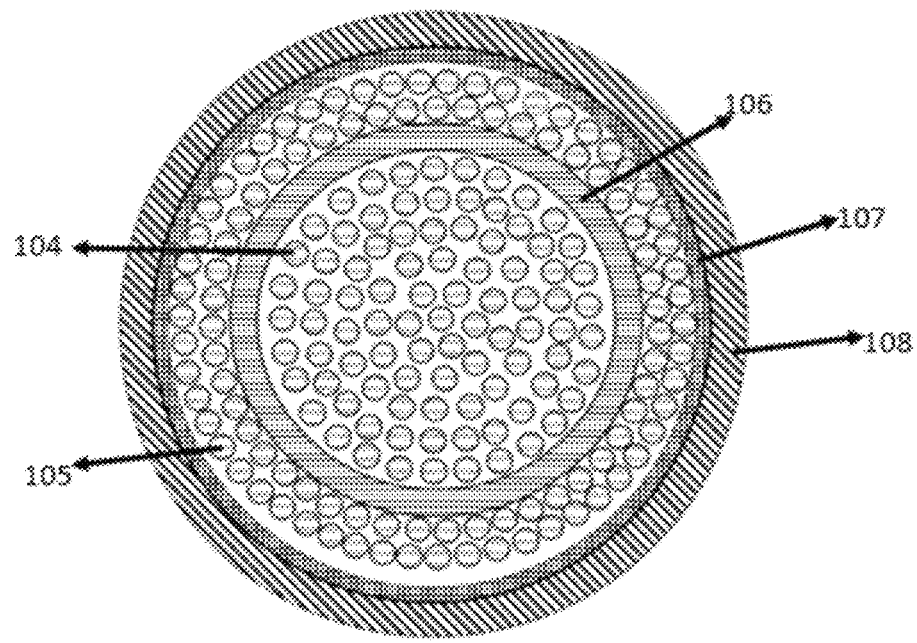
FIG. 2 is a cross-sectional diagram of a detector according to an embodiment of the present disclosure.

Referring to FIG. 1 and FIG. 2, the present disclosure provides an online detection system for type identification and activity measurement of radiations in gas or liquid. The online detection system includes but is not limited to: a detector and an electronic processing unit. The detector is mainly configured to detect each to-be-identified radiation introduced into the detector, and convert the light signals generated due to deposited energy of the radiations inside the detector (the plastic scintillating fibers inside the detector) into the electrical signals. The electronic processing unit is configured to perform type identification and activity measurement of each to-be-identified radiation based on the electrical signals (specifically the waveforms and the time information corresponding to the electrical signals) transmitted by the detector.

In an implementation, the detector may include but is not limited to: a radiation inlet 101, a first measurement chamber 102, a second measurement chamber 103, and a radiation outlet 109. The radiation inlet 101 is communicated with an end of the first measurement chamber 102. The radiation outlet 109 is communicated with the other end of the first measurement chamber 102. That is, to-be-measured material (which may be in a liquid form or in a gas form) is introduced into the first measurement chamber 102 through the radiation inlet 101. The activity measurement is performed in the first measurement chamber 102 and the second measurement chamber 103. After the measurement is completed, the to-be-measured material is exported out of the detector through the radiation outlet 109.

Further, referring to FIG. 1 and FIG. 2, the first measurement chamber 102 is located inside the second measurement chamber 103. A first radiation detection assembly 104 is disposed in the first measurement chamber 102. A second radiation detection assembly 105 is disposed in the second measurement chamber 103. The first measurement chamber 102 and the second measurement chamber 103 are partitioned by a first housing 106. The first housing 106 is configured to separate the to-be-identified radiations with different penetration capabilities in the first measurement chamber 102. Based on the above, the first radiation detection assembly 104 is configured to detect a first scintillation light signal (also called scintillation photons) generated due to the deposited energy of each to-be-identified radiation in the to-be-measured material, where the to-be-measured material is introduced into the first measurement chamber 102 through the radiation inlet 101, and convert the first scintillation light signals of each to-be-identified radiation into electrical signals for transmission to the electronic processing unit. In this way, the electronic processing unit can complete the type identification and the activity measurement of the to-be-identified radiations based on the waveform and the time information of the electrical signal of each to-be-identified radiation. In an embodiment, the first scintillation light signal of any to-be-identified radiation is generated when this to-be-identified radiation irradiates the first radiation detection assembly.

However, there are radiations having the same waveform existing in the first measurement chamber (for example, in the case that the β radiation and the γ radiation exist at the same time, the two radiations have the same waveform). Therefore, the first housing 106 is disposed in the detector to separate the radiations with different penetration capabilities (the penetration capability of the γ radiation is much stronger than that of the β radiation). In this way, the second radiation detection assembly 105 is configured to detect second scintillation light signals of a target radiation (the γ radiation in the foregoing example) in the second measurement chamber 103, and convert the second scintillation light signals of the target radiation into electrical signals, so as to be transmitted to the electronic processing unit. The second scintillation light signals of the target radiation are generated when the target radiation irradiates the second radiation detection assembly. The target radiation is one of the to-be-identified radiations in the first measurement chamber 102 that can penetrate through the first housing 106. Finally, the electronic processing unit is configured to obtain the type and the activity measurement result of each to-be-identified radiation based on the waveform and the time information of the electrical signal of each to-be-identified radiation.

The working principle of the detection system is described below. After the to-be-measured material is introduced into the first measurement chamber 102, the first radiation detection assembly 104 acquires the first scintillation light signals generated due to the deposited energy of each to-be-identified radiation in the to-be-measured material. Then, the first scintillation light signals of each to-be-identified radiation are converted into electrical signals and transmitted to the electronic processing unit. The electronic processing unit discriminates the different types of the to-be-identified radiations in the to-be-measured material based on the waveform of the electrical signal of each to-be-identified radiation, and obtains the activity measurement result of each to-be-identified radiation based on the number information of the electrical signal in unit time. For the to-be-identified radiations with the same waveform (such as the β radiation and the γ radiation) in the first measurement chamber 102, according to the different penetration capabilities of the to-be-identified radiations with the same waveform, the to-be-identified radiation that can penetrate the first housing 106 is acquired in the second measurement chamber 103 (in the case that the β radiation and the γ radiation exist at the same time, the γ radiation penetrates the first housing). Then, the activity measurement information of the γ radiation is obtained using the same principle. Further, the total number of particles of the to-be-identified radiations (such as the β radiation and the γ radiation) with the same waveform can be obtained based on the waveforms of the first measurement chamber, and in combination with the activity measurement information of the target radiation (e.g., the γ radiation) in the second measurement chamber, the numbers of particles of the to-be-identified radiations (i.e., the β radiation and the γ radiation) with the same waveform can be obtained respectively. In this way, the activity measurement of the to-be-identified radiations with the same waveform can be completed.

In some embodiments, two structures of the online detection system are provided below. The first structure is configured to realize the type identification and the activity measurement of the α radiation, the β radiation, and the γ radiation. The second structure is configured to realize the type identification and the activity measurement of the heavy particle radiation, the α radiation, the β radiation, the γ radiation, and the n (neutron) radiation. It should be noted that the difference between the two structures of the online detection system only lies in that: the plastic scintillating fibers used in the first radiation detection assembly 104 and the second radiation detection assembly 105 are different in type. Specifically, in the first structure, the ordinary plastic scintillating fibers coated with silver-doped zinc sulfide powder are used; and in the second structure, the PSD plastic scintillating fibers are used. That is, different plastic scintillating fibers are selected according to the types of the radiations actually measured.

Figure 5:
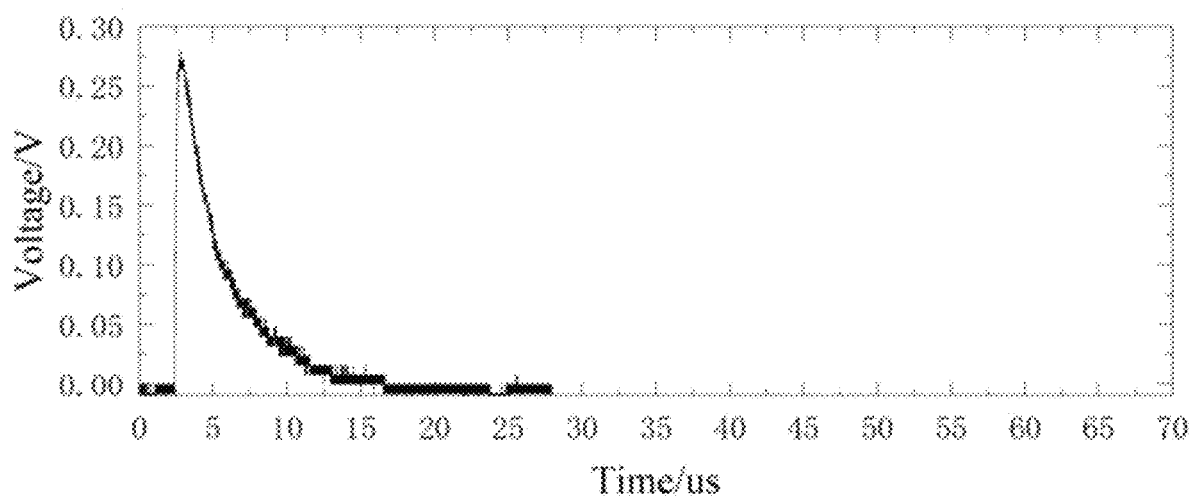
FIG. 5 is a schematic diagram of a signal waveform outputted after first plastic scintillating fibers or second plastic scintillating fibers capture β radiation, or after the first plastic scintillating fibers or the second plastic scintillating fibers capture γ radiation.

In an embodiment, referring to FIG. 3 and FIG. 5, the specific structure of the first online detection system is described below.

In this embodiment, in the case that the to-be-measured material includes the α radiation, the β radiation, and the γ radiation. The first radiation detection assembly 104 may include but is not limited to a first photomultiplier tube, a second photomultiplier tube, and a plurality of first plastic scintillating fibers. Similarly, the second radiation detection assembly 105 may include but is not limited to a third photomultiplier tube, a fourth photomultiplier tube, and a plurality of second plastic scintillating fibers. The specific connection structure of each component is as follows.

For the first radiation detection assembly 104 in the first measurement chamber 102, the plurality of first plastic scintillating fibers extend from an end of the first measurement chamber 102 to the other end. The surface of each first plastic scintillating fiber is coated with silver doped zinc sulfide. An end of each first plastic scintillating fiber is connected to the first photomultiplier tube, and the other end of each first plastic scintillating fiber is connected to the second photomultiplier tube. The first photomultiplier tube and the second photomultiplier tube are both electrically connected to the electronic processing unit. In response to receiving the first scintillation light signals, the first photomultiplier tube and the second photomultiplier tube convert the first scintillation light signals into electrical signals, and transmit the electrical signals to the electronic processing unit, respectively. In response to that the electronic processing unit simultaneously receives the electrical signals transmitted from the first photomultiplier tube and the second photomultiplier tube, an effective signal acquisition of each to-be-identified radiation in the first measurement chamber is completed.

Similarly, for the second radiation detection assembly 105 in the second measurement chamber 103, the plurality of second plastic scintillating fibers all extend from an end of the second measurement chamber 103 to the other end. An end of each second plastic scintillating fiber is connected to the third photomultiplier tube, and the other end of each second plastic scintillating fiber is connected to the fourth photomultiplier tube. The third photomultiplier tube and the fourth photomultiplier tube are both electrically connected to the electronic processing unit. In response to receiving the second scintillation light signals, the third photomultiplier tube and the fourth photomultiplier tube convert the second scintillation light signals into electrical signals, and transmit the electrical signals to the electronic processing unit, respectively. In response to that the electronic processing unit simultaneously receives the electrical signals transmitted from the third photomultiplier tube and the fourth photomultiplier tube, an effective signal acquisition of the target radiation in the second measurement chamber is completed.

In this embodiment, the first scintillation light signals are transmitted to the first photomultiplier tube and second photomultiplier tube at two ends through the corresponding plastic scintillating fibers, and then converted from the light signals to the electrical signals based on the photoelectric effect. The conversion principle of the second scintillation light signals is similar, which is not detailed herein.

Figure 3:
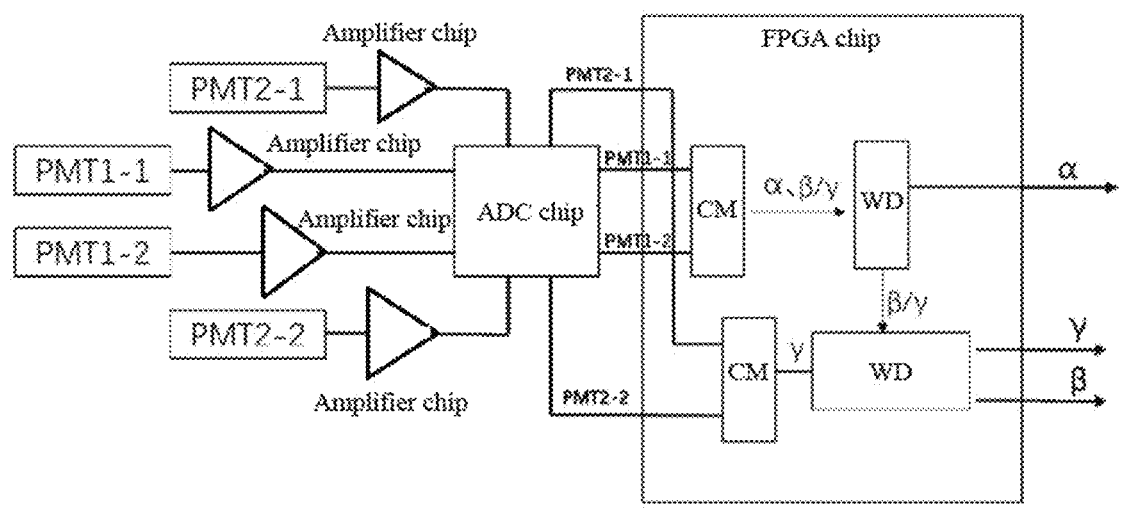
FIG. 3 is a schematic structure diagram of an online detection system according to an embodiment of the present disclosure.

After the electrical signals of different radiations in the two measurement chambers are acquired, the electrical signals can be transmitted to the electronic processing unit for coincidence measurement, waveform identification and activity measurement of the signal time information, which may refer to FIG. 3. The electronic processing unit may include but is not limited to an ADC chip, a FPGA chip, and four amplifier chips. The first photomultiplier tube (represented by PMT1-1 in FIG. 3), the second photomultiplier tube (represented PMT1-2 in FIG. 3), the third photomultiplier tube (represented PMT2-1 in FIG. 3), and the fourth photomultiplier tube (represented PMT2-2 in FIG. 3) are respectively in electrical connection with the input terminal of the ADC chip. The output terminal of the ADC chip is electrically connected to the FPGA chip. The FPGA chip is configured to perform the type identification and the activity measurement of the $\alpha$ radiation, the $\beta$ radiation, and the $\gamma$ radiation in the to-be-measured material, based on the electrical signals outputted from the first photomultiplier tube, the second photomultiplier tube, the third photomultiplier tube and the fourth photomultiplier tube.

In an embodiment, the specific working process of the FPGA chip is as follows: obtaining the coincidence measurement result of the $\alpha$ radiation and the total coincidence measurement result of the $\beta$ radiation and the $\gamma$ radiation, based on the waveforms obtained based on the electrical signals outputted from the first photomultiplier tube and the second photomultiplier tube (that is, the waveforms of the electrical signals corresponding to different radiations are different, and the time information of the electrical signals is different); and obtaining the coincidence measurement result of the $\gamma$ radiation, based on the waveform of the electrical signals outputted from the third photomultiplier tube and the fourth photomultiplier tube (similarly, including the time information). The FPGA chip is further configured to perform anti-coincidence measurement based on the total coincidence measurement result of the $\beta$ radiation and the $\gamma$ radiation and the coincidence measurement result of the $\gamma$ radiation, to obtain the activity measurement result of the $\beta$ radiation.

That is, in this embodiment, the four-channel high-speed ADC chip acquires the signals outputted by the photomultiplier tubes in pairs, and transmits the signals to the back-end FPGA chip in real time. The FPGA chip processes the data in real time. Specifically, the FPGA chip performs the coincidence measurement on the two photomultiplier tubes in the internal chamber. Only in the case that the signals outputted by the first photomultiplier tube and the photomultiplier tube are acquired at the same time, it is considered as a valid radiation incidence. Then, the FPGA chip identifies whether it is the $\alpha$ radiation or the $\beta/\gamma$ radiation (the two have the same waveform) based on the waveforms. In the case of the $\alpha$ radiation, the activity of the $\alpha$ radiation is counted. In the case of the $\beta/\gamma$ radiation, the anti-coincidence counting is performed based on the output signals (i.e., the activity measurement result of the $\gamma$ radiation) of the two photomultiplier tubes in the second measurement chamber, thereby realizing the activity measurement of the $\beta$ radiation.

Further, the principle that the first plastic scintillating fibers coated with ZnS (Ag) powder can realize the waveform discrimination of the $\alpha$ radiation and the $\beta$ radiation is described below.

The scintillation luminescence time of the plastic scintillating fiber includes the rise time and the decay time of the scintillation pulse. Different scintillators have different properties, and have different scintillation luminescence time after absorbing radiations. The plastic scintillator is widely applied, and very sensitive to the $\beta$ radiation and the $\gamma$ radiation. However, the scintillation luminescence decay time of the plastic scintillator is relatively short. FIG. 5 is the waveform (certainly, it is obtained through integration by a photoelectric conversion device and a charge sensitive preamplifier) generated after the $\beta$ radiation or the $\gamma$ radiation is injected into the second plastic scintillating fibers.

Figure 4:
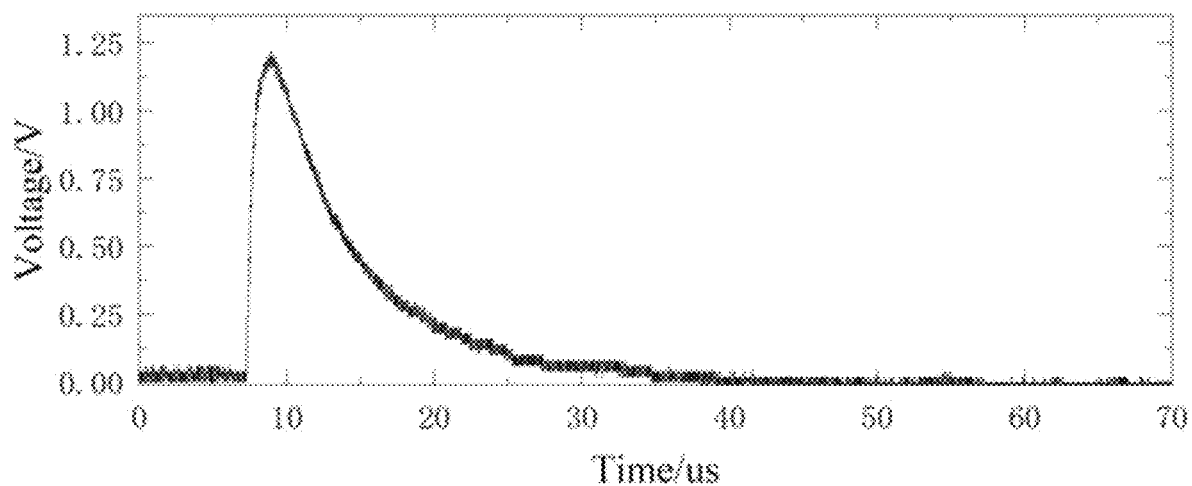
FIG. 4 is a schematic diagram of a signal waveform outputted after first plastic scintillating fibers capture α radiation according to an embodiment of the present disclosure.

The first plastic scintillating fibers coated with ZnS (Ag) have a very high luminous efficiency, thus having a great ability to shield the $\alpha$ radiation. The ZnS (Ag) layer with a mass thickness of 15 mg/cm$^2$ has an almost 100% detection efficiency for the $\alpha$ radiation with energy 5 MeV, but is extremely insensitive to the $\gamma$ radiation. The decay time of the scintillation luminescence generated by the $\alpha$ radiation acting on the first plastic scintillating fibers coated with ZnS (Ag) is longer than that of the normal second plastic scintillators. The waveform generated after the same photoelectric conversion device and the integration by the charge-sensitive preamplifier is shown in FIG. 4.

In the case that the $\alpha$ radiation, the $\beta$ radiation, and the $\gamma$ radiation are in the to-be-measured material, the $\alpha$ radiation reacts with the ZnS (Ag) powder outside the first plastic scintillating fibers, to produce scintillation photons. The scintillation photons are transmitted to the photomultiplier tubes at two ends (i.e., the first photomultiplier tube and second photomultiplier tube) through the internal optical fibers and acquired by the photomultiplier tubes. Similarly, the $\beta$ radiation and the $\gamma$ radiation penetrate the ZnS (Ag) powder, and deposits energy in the plastic scintillating fibers, to produce scintillation photons. The scintillation photons are transmitted through the fibers and acquired by the photomultiplier tubes at two ends. Since the $\gamma$ radiation mainly generate electrons (i.e., the $\beta$ radiation) in the plastic scintillating fibers based on Compton effect, and the electrons deposit energy in the plastic scintillating fibers, the scintillation lights generated by the β radiation and the γ radiation in the plastic scintillating fibers are in the same form. Therefore, it is impossible for the plastic scintillating fibers to identify the β radiation and the γ radiation by the waveforms. Therefore, by disposing the aluminum layer (i.e., the first housing) between the first measurement chamber and the second measurement chamber to separate the β radiation and the γ radiation, it is ensured that only the scintillation light signal generated by the γ radiation can be detected in the second measurement chamber, thereby realizing the identification and the activity measurement of the β radiation and the γ radiation.

Based on the above, the working principle of the online detection system according to the second aspect of the present disclosure is described below.

The detector according to the second aspect of the present disclosure is divided into the inner layer and the outer layer. The inner layer is the first plastic scintillating fibers that are uniformly arranged and coated with ZnS (Ag) (silver-doped zinc sulfide) powder. The outer layer is an array of the ordinary uncoated plastic scintillating fibers (which are not limited to the ordinary plastic scintillating fibers, and may be cesium iodide crystals or sodium iodide crystals with extremely high detection efficiency for the γ radiation) that are uniformly arranged around the inner layer. An aluminum layer is disposed between the inner layer and the outer layer.

The to-be-measured material only circulates in the inner tubes (the first measurement chamber 102). Therefore, the inner first plastic scintillating fibers can discriminate the α radiation, the β radiation, and the γ radiation in the to-be-measured material through waveform discrimination (the β radiation and the γ radiation cannot be discriminated by the waveforms). In addition, the count of the α radiation and the total count of the β radiation and the γ radiation are respectively obtained by the PMT1-1 (first photomultiplier tube) and the PMT1-2 (second photomultiplier tube) and the subsequent electronic system (the coincidence measurement performed by the two photomultiplier tubes at two ends of the same scintillating fiber array can reduce the noise effect of the dark current). The middle aluminum layer shields the β radiation emitted from the first measurement chamber 102 to the second measurement chamber 102, but has almost no effect on the γ radiation.

Since the penetration ability of the γ radiation is much higher than that of the β radiation with the same energy, the γ radiation can easily penetrate the aluminum layer and be acquired by the uncoated ordinary plastic scintillating fiber array (each second plastic scintillating fiber). Further, the detector can extract the count of the γ radiation. Considering that the aluminum layer may shield a small part of the γ radiation, the relationship between the activity of the internal γ radiation and the γ radiation count detected by the second measurement chamber can be obtained through experimental calibration. In this way, the activity of the internal γ radiation can be inferred from the γ radiation count measured in the outer layer.

In an embodiment, based on the foregoing principles, the second plastic scintillating fibers in the second measurement chamber 102 may be NaI sodium iodide or CsI cesium iodide with high detection efficiency for the γ radiation, so as to improve detection sensitivity for the γ radiation.

Therefore, the internal first plastic scintillating fibers coated with ZnS (Ag) powder acquired the total activity of the β radiation and the γ radiation, and the external ordinary plastic scintillating fibers measure the activity of the γ radiation. The activity of the internal γ radiation can be obtained based on the γ radiation count measured by the external plastic scintillating fibers and according to the experimental calibration. In this way, the activities of the internal β radiation and γ radiation can be obtained respectively through anti-coincidence measurement.

Figure 6:
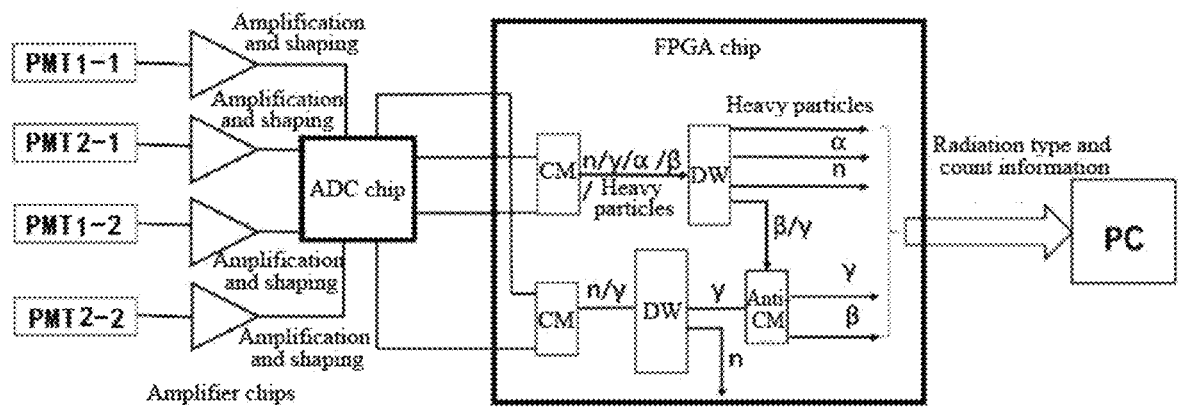
FIG. 6 is another schematic structure diagram of an online detection system according to an embodiment of the present disclosure.
Figure 7:
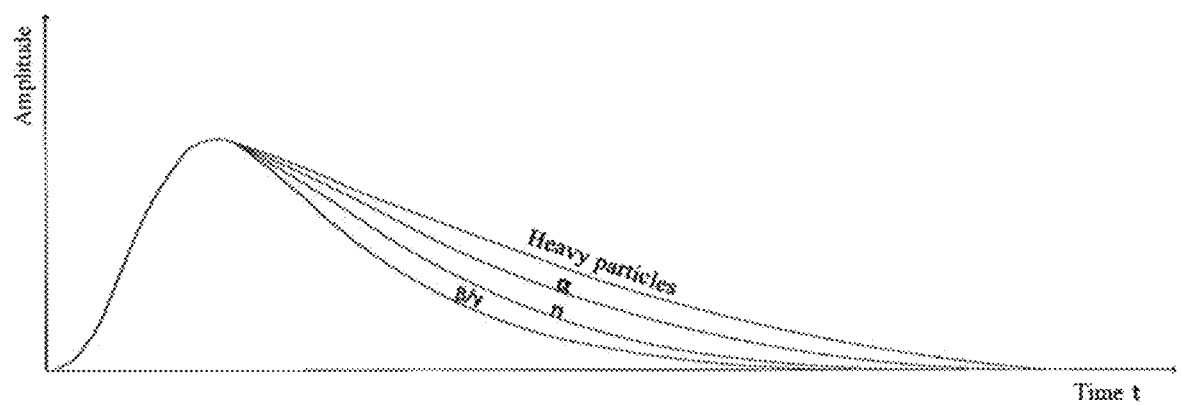
FIG. 7 is a schematic diagram of waveforms obtained when first PSD plastic scintillating fibers perform radiation measurement according to an embodiment of the present disclosure.

Referring to FIG. 6 and FIG. 7, the third aspect of the present disclosure provides a specific structure of the online detection system according to the second aspect. Specifically, when being implemented, on the basis of the first structure, the plastic scintillating fibers in the first structure are replaced with PSD plastic scintillating fibers. The specific structure is descried below.

In an embodiment, in the case that the to-be-measured material includes heavy particle radiation, α radiation, β radiation, γ radiation, and n radiation, the first radiation detection assembly 104 includes a first photomultiplier tube, a second photomultiplier tube, and a plurality of first PSD plastic scintillating fibers. The second radiation detection assembly 105 includes a third photomultiplier tube, a fourth photomultiplier tube, and a plurality of second PSD plastic scintillating fibers. Each of these components has the same arrangement structure and connection manner as the corresponding one in the second aspect of the present disclosure. The difference only lies in that the plastic scintillating fibers in the second aspect of the present disclosure are replaced with the PSD plastic scintillating fibers, whose structure may refer to the second aspect of the present disclosure.

During signal transmission, in response to receiving the first scintillation light signals, the first photomultiplier tube and the second photomultiplier tube convert the first scintillation light signals into electrical signals, and transmit the electrical signals to the electronic processing unit. When the electronic processing unit simultaneously receives the electrical signals transmitted from the first photomultiplier tube and the second photomultiplier tube, an effective signal acquisition of each to-be-identified radiation in the first measurement chamber 102 is completed. Similarly, in response to receiving the second scintillation light signals, the third photomultiplier tube and the fourth photomultiplier tube convert the second scintillation light signals into electrical signals, and transmit the electrical signals to the electronic processing unit respectively. When the electronic processing unit simultaneously receives the electrical signals transmitted from the third photomultiplier tube and the fourth photomultiplier tube, it is considered that an effective signal acquisition of each target radiation in the second measurement chamber 103 is completed.

After completing the acquisition of the light signals of different radiations in the two measurement chambers, the electronic processing unit performs the type identification and the activity measurement of the radiations. In the third aspect of the present disclosure, the electronic processing unit has the consistent structure with that in the second aspect of the present disclosure, and the connection relationship can refer to the second aspect of the present disclosure. In this embodiment, the FPGA chip is configured to complete the type identification and the activity measurement of the heavy particle radiation, the α radiation, the β radiation, the γ radiation, and the n radiation in the to-be-measured material, based on the electrical signals outputted from the first photomultiplier tube, the second photomultiplier tube, the third photomultiplier tube and the fourth photomultiplier tube.

In an embodiment, the specific working process of the FPGA chip is as follows: obtaining the waveforms of the heavy particle radiation, the α radiation and the n radiation, based on the electrical signal waveforms and the time information outputted by the first photomultiplier tube and the second photomultiplier tube; and performing the type identification and the activity measurement of the heavy particle radiation, the α radiation and the n radiation, according to the waveforms of the heavy particle radiation, the α radiation and the n radiation. The electrical signals outputted from the first photomultiplier tube and the second photomultiplier tube are generated based on a first scintillation light signal generated when each to-be-identified radiation irradiates each first PSD plastic scintillating fiber.

Similarly, the FPGA chip is further configured to perform the type identification and the activity measurement of the γ radiation in the to-be-measured material, based on the waveform obtained by the electrical signals outputted from the third photomultiplier tube and the fourth photomultiplier tube (that is, the type identification and the activity measurement of the γ radiation is performed based on the waveform and the time information). The electrical signals outputted from the third photomultiplier tube and the fourth photomultiplier tube are generated based on a second scintillation light signal generated when a target radiation irradiates each second PSD plastic scintillating fiber.

Further, the FPGA chip is further configured to obtain the total activity (which is also obtained based on the waveforms and the time information) of the β radiation and the γ radiation based on the waveform obtained by the electrical signals outputted from the first photomultiplier tube and the second photomultiplier tube, and obtain the activity measurement result of the β radiation based on the total activity of the β radiation and the γ radiation and the activity measurement result of the γ radiation.

Based on the foregoing description, the working principle of the detection system provided by the third aspect of the present disclosure is described below.

In the case that the α radiation, the β radiation, the γ radiation, the neutrons, and the heavy particles are in the to-be-measured material at the same time, the first PSD plastic scintillating fibers (in the first measurement chamber 102) can detect all of the radiations at the same time. In combination with the back-end electronic processing unit, the α radiation, the neutrons, the heavy particles, and the β/γ radiation can be identified according to different waveforms. Referring to FIG. 7, different incident radiations can be identified according to the different tail edges of the waveforms. However, as can be seen from FIG. 7, the β radiation and the γ radiation have the same waveform. Therefore, it is impossible to independently identify the two radiations in the first measurement chamber 102. That is, the first PSD plastic scintillating array can detect the γ radiation and the β radiation, but cannot distinguish the β radiation and the γ radiation. Since the γ radiation has a much higher penetration ability than the β radiation with the same energy, the γ radiation can easily penetrate the aluminum layer and be captured by the second PSD plastic scintillating fibers. The second PSD plastic scintillating fibers (in the second measurement chamber 103) can identify, according to the difference in the waveforms, the γ radiation and the neutrons penetrating the aluminum layer, and further obtain the count of the γ radiation according to the waveforms. Finally, based on the total count of the γ radiation and the β radiation acquired by the first PSD plastic scintillating fibers, and the count of the γ radiation acquired by the second PSD plastic scintillating fibers, the count of the β radiation and the count of the γ radiation can be respectively obtained, so as to identify the β radiation and the γ radiation, and obtain the activities of the β radiation and the γ radiation.

From above, with the foregoing description of the two structures of the online detection system, the present disclosure can detect the light signals generated by different types of radiation in real time. After the light signals are converted into the electrical signals, the electrical signals are input into the four-channel high-speed ADC through the amplifiers. Then, the ADC converts the analog signals into digital signals, and transmits the digital signals to the back-end FPGA, so as to realize the type identification and the activity online measurement of the radiations in the FPGA. Therefore, the process of the type identification and the activity measurement of the radiations provided by the present disclosure has the advantages of short detection time, high efficiency, and strong real-time performance.

In an embodiment, referring to FIG. 1 and FIG. 2, the fourth aspect of the present disclosure provides an online detection system with a richer structure than those provided in the first, second and third aspects of the present disclosure.

First, the first housing 106 may be made of, but not limited to, aluminum and the like, whose thickness may be specifically set according to the type and energy of the radiation to be measured.

Secondly, in this embodiment, a second housing 107 is disposed outside the second measurement chamber 103. The second housing 107 is made of radiation shielding metal. Optionally, the second housing 107 may be made of, but not limited to, lead metal material and the like.

In addition, in an embodiment, a third housing 108 is further wrapped outside the second housing 107. The third housing 108 is made of plastic material. In this way, the second housing 107 and the third housing 108 can prevent external radiation from affecting the detector, thereby reducing detection error.

It should be noted that the foregoing embodiments are merely preferred embodiments of the present disclosure, and are not intended to limit the protection scope of the present disclosure. Any modification, equivalent replacement, and improvement made within the spirit and principle of the present disclosure shall be included in the protection scope of the present disclosure.

What is claimed is:

1. An online detection system for type identification and activity measurement of radiations in gas or liquid, comprising:
   a detector; and
   an electronic processing unit; wherein,
   the detector comprises:
   a radiation inlet;
   a first measurement chamber;
   a second measurement chamber; and
   a radiation outlet; wherein,
   the radiation inlet is communicated with an end of the first measurement chamber, and the radiation outlet is communicated with the other end of the first measurement chamber;
   the first measurement chamber is located in the second measurement chamber; wherein the first measurement chamber is configured to provide a space for to-be-measured material, and the to-be-measured material circulates exclusively within the first measurement chamber;
   a first radiation detection assembly is disposed in the first measurement chamber and is in direct contact with to-be-measured material, and a second radiation detection assembly is disposed in the second measurement chamber; wherein the first radiation detection assembly comprises a plurality of first plastic scintillating fibers or a plurality of first pulse shape discrimination (PSD) plastic scintillating fibers;

the first measurement chamber and the second measurement chamber are separated by a first housing;

the first radiation detection assembly is configured to detect a first scintillation light signal of each to-be-identified radiation in the to-be-measured material introduced into the first measurement chamber from the radiation inlet, and convert the first scintillation light signal of each to-be-identified radiation into an electrical signal, so as to be transmitted to the electronic processing unit; wherein the first scintillation light signal of any to-be-identified radiation is generated when the to-be-identified radiation irradiates the first radiation detection assembly, and the first housing is configured to separate the to-be-identified radiations with different penetration capabilities in the first measurement chamber;

the second radiation detection assembly is configured to detect a second scintillation light signal of a target radiation in the second measurement chamber, and convert the second scintillation light signal of the target radiation into an electrical signal, so as to be transmitted to the electronic processing unit; wherein the second scintillation light signal of the target radiation is generated when the target radiation irradiates the second radiation detection assembly, and the target radiation is the to-be-identified radiation in the first measurement chamber that is able to penetrate the first housing; and the electronic processing unit is configured to generate a waveform of each to-be-identified radiation based on the electrical signal of each to-be-identified radiation and the electrical signal of the target radiation, and obtain a type and an activity measurement result of each to-be-identified radiation based on the waveform of each to-be-identified radiation.

2. The online detection system according to claim 1, wherein in a case that the to-be-measured material comprises alpha (α) radiation, beta (β) radiation and gamma (γ) radiation, the first radiation detection assembly further comprises a first photomultiplier tube, a second photomultiplier tube, and the second radiation detection assembly comprises a third photomultiplier tube, a fourth photomultiplier tube, and a plurality of second plastic scintillating fibers; wherein, the plurality of first plastic scintillating fibers extend from an end of the first measurement chamber to the other end; a surface of each first plastic scintillating fiber is coated with silver-doped zinc sulfide; an end of each first plastic scintillating fiber is connected to the first photomultiplier tube, and the other end of each first plastic scintillating fiber is connected to the second photomultiplier tube; and the first photomultiplier tube and the second photomultiplier tube are both electrically connected to the electronic processing unit;

in response to that the first photomultiplier tube and the second photomultiplier tube receive the first scintillation light signals, the first photomultiplier tube and the second photomultiplier convert the first scintillation light signals into the electrical signals and transmit the electrical signals to the electronic processing unit, respectively; and in response to that the electronic processing unit simultaneously receives the electrical signals transmitted from the first photomultiplier tube and the second photomultiplier tube, an effective signal acquisition of each to-be-identified radiation in the first measurement chamber is completed;

the plurality of second plastic scintillating fibers extend from an end of the second measurement chamber to the other end; an end of each second plastic scintillating fiber is connected to the third photomultiplier tube, and the other end of each second plastic scintillating fiber is connected to the fourth photomultiplier tube; and the third photomultiplier tube and the fourth photomultiplier tube are both electrically connected to the electronic processing unit;

in response to that the third photomultiplier tube and the fourth photomultiplier tube receive the second scintillation light signal, the third photomultiplier tube and the fourth photomultiplier tube convert the second scintillation light signal into the electrical signals and transmit the electrical signals to the electronic processing unit; and in response to that the electronic processing unit simultaneously receives the electrical signals transmitted from the third photomultiplier tube and the fourth photomultiplier tube, an effective signal acquisition of the target radiation in the second measurement chamber is completed.

3. The online detection system according to claim 2, wherein the electronic processing unit comprises:

an analog-to-digital converter (ADC) chip;

a field-programmable gate array (FPGA) chip; and four amplifier chips; wherein, each of the first photomultiplier tube, the second photomultiplier tube, the third photomultiplier tube and the fourth photomultiplier tube is electrically connected to an input terminal of the ADC chip through one of the four amplifier chips;

output terminals of the ADC chip are electrically connected to the FPGA chip; and the FPGA chip is configured to complete the type identification and the activity measurement of the α radiation, the β radiation, and the γ radiation in the to-be-measured material, based on the electrical signals outputted from the first photomultiplier tube, the second photomultiplier tube, the third photomultiplier tube and the fourth photomultiplier tube.

4. The online detection system according to claim 3, wherein the FPGA chip is configured to:

obtain a coincidence measurement result of the α radiation and a total coincidence measurement result of the β radiation and the γ radiation, based on the waveforms obtained by the electrical signals outputted from the first photomultiplier tube and the second photomultiplier tube; and obtain a coincidence measurement result of the γ radiation, based on the waveform obtained by the electrical signals outputted from the third photomultiplier tube and the fourth photomultiplier tube; and the FPGA chip is further configured to:

perform anti-coincidence measurement based on the total coincidence measurement result of the β radiation and the γ radiation and the coincidence measurement result of the γ radiation, to obtain an activity measurement result of the β radiation.

5. The online detection system according to claim 1, wherein, in a case that the to-be-measured material comprises heavy particle radiation, α radiation, β radiation, γ radiation and neutron (n) radiation, the first radiation detection assembly further comprises a first photomultiplier tube, a second photomultiplier tube, and the second radiation detection assembly comprises a third photomultiplier tube, a fourth photomultiplier tube, and a plurality of second PSD plastic scintillating fibers;

the plurality of first PSD plastic scintillating fibers extend from an end of the first measurement chamber to the other end; an end of each first PSD plastic scintillating fiber is connected to the first photomultiplier tube, and the other end of each first PSD plastic scintillating fiber is connected to the second photomultiplier tube; and the first photomultiplier tube and the second photomultiplier tube are both electrically connected to the electronic processing unit;

in response to receiving the first scintillation light signals, the first photomultiplier tube and the second photomultiplier tube convert the first scintillation light signals into the electrical signals, and transmit the electrical signals to the electronic processing unit respectively; and in response to that the electronic processing unit simultaneously receives the electrical signals transmitted from the first photomultiplier tube and the second photomultiplier tube, an effective signal acquisition of each to-be-identified radiation in the first measurement chamber is completed; and the plurality of second PSD plastic scintillating fibers all extend from an end to the other end of the second measurement chamber; an end of each second PSD plastic scintillating fiber is connected to the third photomultiplier tube, and the other end of each second PSD plastic scintillating fiber is connected to the fourth photomultiplier tube; and the third photomultiplier tube and the fourth photomultiplier tube are both electrically connected to the electronic processing unit;

in response to receiving the second scintillation light signal, the third photomultiplier tube and the fourth photomultiplier tube convert the second scintillation light signal into the electrical signals, and transmit the electrical signals to the electronic processing unit; and in response to that the electronic processing unit simultaneously receives the electrical signals transmitted from the third photomultiplier tube and the fourth photomultiplier tube, an effective signal acquisition of the target radiation in the second measurement chamber is completed.

6. The online detection system according to claim 5, wherein the electronic processing unit comprises:
an ADC chip;
a FPGA chip; and
four amplifier chips; wherein,
each of the first photomultiplier tube, the second photomultiplier tube, the third photomultiplier tube and the fourth photomultiplier tube is electrically connected to an input terminal of the ADC chip through one of the four amplifier chips;
outputs terminal of the ADC chip are electrically connected to the FPGA chip; and
the FPGA chip is configured to complete the type identification and the activity measurement of the heavy particle radiation, the α radiation, the β radiation, the γ radiation, and the n radiation in the to-be-measured material, based on the electrical signals outputted from the first photomultiplier tube, the second photomultiplier tube, the third photomultiplier tube and the fourth photomultiplier tube.

7. The online detection system according to claim 6, wherein the FPGA chip is configured to:
obtain the waveforms of the heavy particle radiation, the α radiation, and the n radiation, based on the electrical signals outputted from the first photomultiplier tube and the second photomultiplier tube; and
perform the type identification and the activity measurement of the heavy particle radiation, the α radiation, and the n radiation, according to the waveforms of the heavy particle radiation, the α radiation, and the n radiation; wherein,
the electrical signals outputted from the first photomultiplier tube and the second photomultiplier tube are generated based on the first scintillation light signal generated when each to-be-identified radiation irradiates each first PSD plastic scintillating fiber.

8. The online detection system according to claim 6, wherein the FPGA chip is configured to:
perform the type identification and the activity measurement of the γ radiation in the to-be-measured material, based on the waveform obtained by the electrical signals outputted from the third photomultiplier tube and the fourth photomultiplier tube; wherein,
the electrical signals outputted from the third photomultiplier tube and the fourth photomultiplier tube are generated based on the second scintillation light signal generated when the target radiation irradiates each second PSD plastic scintillating fiber.

9. The online detection system according to claim 8, wherein the FPGA chip is configured to:
obtain a total activity of the β radiation and the γ radiation, based on the waveforms obtained by the electrical signals outputted from the first photomultiplier tube and the second photomultiplier tube; and
obtain an activity measurement result of the β radiation, based on the total activity of the β radiation and the γ radiation and an activity measurement result of the y radiation.

* * * * *